United States Patent [19]

Bukac et al.

[11] 4,042,572
[45] Aug. 16, 1977

[54] PREPARATION OF POLYAMIDES BY ANIONIC POLYMERIZATION WITH SUBSTITUTED TRIAZINE TRIONES AS COCATALYST

[75] Inventors: Zbynek Bukac; Jan Sebenda, both of Prague, Czechoslovakia

[73] Assignee: Ceskoslovenska akademie ved, Prague, Czechoslovakia

[21] Appl. No.: 632,210

[22] Filed: Nov. 17, 1975

Related U.S. Application Data

[63] Continuation-in-part of Ser. No. 275,156, July 26, 1972, abandoned.

[30] Foreign Application Priority Data

July 27, 1971 Czechoslovakia .................. 5479/71
July 27, 1971 Czechoslovakia .................. 5480/71

[51] Int. Cl.² ............................................. C08G 69/18
[52] U.S. Cl. .................. 260/78 L; 260/78 P
[58] Field of Search ............................ 260/78 L, 78 P

[56] References Cited

U.S. PATENT DOCUMENTS

| | | | |
|---|---|---|---|
| 3,017,391 | 1/1962 | Mottus et al. | 260/78 L |
| 3,448,085 | 6/1969 | Pietrusza et al. | 260/78 L |
| 3,803,101 | 4/1974 | Matsuo et al. | 260/78 L |

*Primary Examiner*—Harold D. Anderson

[57] ABSTRACT

Preparation of polyamides by anionic polymerization or copolymerization of cyclic lactams which comprises conducting the polymerization in the presence of a six membered cyclic co-catalyst containing three

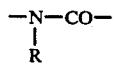

groups and represented by the formula:

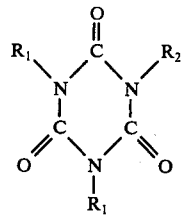

wherein $R_1$ and $R_2$ are each selected from the group consisting of aryl groups, or containing two

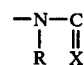

groups and represented by the formula:

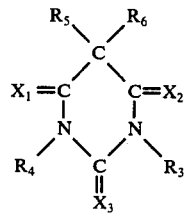

wherein $R_3$, $R_4$, $R_5$ and $R_6$ are each selected from the group consisting of alkyl (C 1-18) and aryl groups and combinations thereof, and $X_1$, $X_2$ and $X_3$ are either sulphur or oxygen, except that at least two members of the group $X_1$, $X_2$ and $X_3$ must be oxygen.

Preferably, the aryl contains from 1 to 3 benzene rings, or can be an alkoxyaryl or dialkylaminoaryl. The alkyl can be an arylated alkyl.

9 Claims, No Drawings

PREPARATION OF POLYAMIDES BY ANIONIC POLYMERIZATION WITH SUBSTITUTED TRIAZINE TRIONES AS COCATALYST

CROSS-REFERENCE TO RELATED APPLICATIONS

The present invention is related to co-pending U.S. application Ser. No. 275,155 filed on July 6, 1972, now U.S. Pat. No. 3,843,608 to which reference is made. This application is a continuation in part of U.S. application Ser. No. 275,156 filed on July 26, 1972, now abandoned.

BACKGROUND OF THE INVENTION

1. Field of the Invention

The invention relates to a method of preparing polyamides by anionic polymerization and copolymerization of cyclic lactams.

2. Description of the Prior Art

The anionic polymerization of lactams, catalyzed by strong bases alone, has a satisfactory velocity only at comparatively high temperatures, e.g. at 250° C, i.e. above the melting point of the resulting polyamide. The method cannot be therefore used for polymerization casting. A substantial increase of the reaction velocity takes place only if co-catalysts are added to the monomer-catalyst mixture, i.e. to a mixture of the respective lactam with its alkali metal salt or with an alkali metal hydride. Such co-catalysts, capable of forming centers of growth, are described e.g. in the U.S. Pat. No. 3,017,391.

Many effective co-catalysts of the anionic lactam polymerization have been reported, e.g. diacyl amines, isocyanates and others. Isocyanates are broadly used because of their high activity and easy accessibility. Particularly polyfunctional isocyanates are often used for polymerization whereby very tough polyamide articles such as large gears, bearings and similar are manufactured.

The use of isocyanates has, however, the disadvantage of high toxicity of these compounds, particularly their ability to provoke the growth of cancerous tumors. Moreover, their activity is sometimes too high even at comparatively low temperatures of about 150° C at which the casting is usually carried out. This is particularly disadvantageous in the manufacture of large castings where the adiabatic course of polymerization is essential. The too high polymerization velocity causes rapid increase of viscosity so that gas bubbles may be trapped in the casting. In the case of lactams polymerizing at a comparatively high rate and yielding polyamides with a comparatively low melting point, the interior of a very large casting may be partly melted, causing contraction cavities. Moreover, in case of rapidly polymerizing lactams such as caprylolactam or laurolactam, the pot-life of the initiated monomer mixture is too short and large castings cannot be made from a singly monomer batch.

The use of low molecular weight nylon-1 polymer is taught in U.S. Pat. No. 3,681,473, to Chow. However, it has to be stressed, that linear oligomers and polymers of isocyanates (nylon 1) are thermally unstable. At temperatures at which lactams are usually polymerized (i.e. 170°–240° C) the degradation of poly(phenylisocyanate) amounts 76–87%. The main product of thermal decomposition is the highly toxic phenylisocyanate (see Iwakura et al. J. Polymer Sci. A-1,6,2611 (1968)). On the other hand, the six-membered cyclic trimers of isocyanates are thermally very stable and there is no danger of poisoning when solutions of the cyclic trimer in molten lactams are handled during the polymerization. It would generally appear that cyclic trimer compounds having such a high stability inherent to six member rings would be inactive as activators of anionic polymerization.

SUMMARY OF THE INVENTION

It has been now found that all above mentioned disadvantages can be avoided when using, according to the invention, as co-catalysts cyclic compounds containing three

groups and represented by the formula:

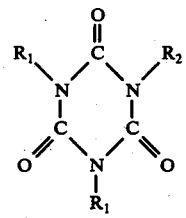

I.

and cyclic compounds containing two

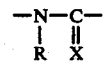

groups and represented by the formula:

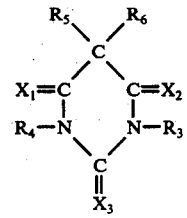

II.

In the above formulae $R_1$ and $R_2$ are aryl groups, $R_3$, $R_4$, $R_5$ and $R_6$ designates hydrogen an aryl or alkyl (C 1 to 18) group or combinations thereof, except that no more than one of $R_5$, $R_6$, $R_3$ and $R_4$ can be hydrogen. Preferably, the aryl has from one to three benzene rings or is a lower alkoxyaryl or a diloweralkylaminoaryl. $R_5$, $R_6$, $R_3$ and $R_4$ can be the same or different groups.

$X_1$, $X_2$ and $X_3$ are either sulfur or oxygen, except that at least two members of the group $X_1$, $X_2$ and $X_3$ must be oxygen.

Co-catalysts of this group have the advantage that the rate of polymerization as well as the degree of polymerization can be easily controlled either by using a particular co-catalyst with an appropriate activity to the given lactam, or by using a blend of such co-catalysts possessing different initiation activity.

DESCRIPTION OF THE PREFERRED EMBODIMENTS

The preparation of polyamides by anionic polymerization or copolymerization of cyclic lactams, in accordance with the present invention, involves the use of an alkali metal hydride or an alkali metal salt of the lactam as a catalyst and a cyclic co-catalyst.

Sodium represents the more common alkali metal which can be employed in the catalyst.

The co-catalysts are cyclic compounds containing three

groups and represented by the formula:

I.

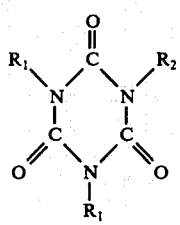

and cyclic compounds containing two

groups and represented by the formula:

II.

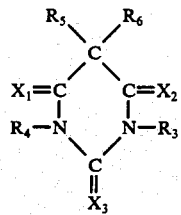

In the above formulae $R_1$ and $R_2$ each designates an aryl group, $R_3$, $R_4$, $R_5$ and $R_6$ each designates hydrogen, an aryl or alkyl group or combinations thereof, except that no more than one of $R_3$, $R_4$, $R_5$ and $R_6$ can be hydrogen. $R_3$, $R_4$, $R_5$ and $R_6$ can be the same or different groups.

$X_1$, $X_2$ and $X_3$ are either sulfur or oxygen, except that at least two members of the group $X_1$, $X_2$ and $X_3$ must be oxygen.

Preferably, at least one of $R_3$, $R_4$, $R_5$ and $R_6$ includes an aryl group and at least two of $R_3$, $R_4$, $R_5$ and $R_6$ are the same.

The aryl group preferably has from 1 to 3 benzene rings, as for example in phenyl and napthyl radicals. Alkylated aryls such as tolyl and alkoxy aryls such as methoxy phenyl are also employed in the preferred co-catalysts, as are di lower alkyl amino aryls can also be used.

The alkyl radicals are preferably lower alkyls, that is, alkyls having from 1 to 18 carbons, as for example ethyl, butyl, lauryl and octadecyl. Arylated alkyls can also be employed as for example, the preferred radical group benzyl.

The anionic polymerization takes place more slowly and in a more regular fashion when using the new co-catalysts of the invention as compared to the use of diacyl amines or isocyanates. This has the advantage that the polymerization velocity and the rate at which the polymerization heat is liberated may be controlled either by choosing an appropriate co-catalyst for the given lactam, or by using simultaneously two or more co-catalysts having different activity. The possibility of controlling the rate of polymerization is particularly useful in the monomer-casting technology and in polymerization connected with continuous extrusion of the polymerizing mixture. Simultaneously, the degree of polymerization can be also controlled. The co-catalysts of the invention are not cancerogenic.

The co-catalysts of the invention are easily accessible and may be prepared in various ways, e.g. as disclosed by Arnold: *Chem. Revs.*, 57, 47 (1957).

Some derivatives of sym. triazines with different substituents on the nitrogen atom, mentioned below in this Specification, were prepared by the method disclosed in *Tetrahedron Letters* 48, 4033 (1968) and by analogical methods, or by the method described in *J. Org. Chem.* 26, 3334 (1961).

Derivatives of the barbituric and thiobarbituric acid, used as co-catalysts according to this invention, are also well accessible and may be easily prepared by known methods. From commercially available 5,5-disubstituted barbituric acid may be obtained, 1,3-dimethyl and 1,3-diethyl barbituric acids e.g., by the method disclosed by Bush, M. T., et al,; *J. Pharmacol.* 61, 139 (1937). All other N-substituted barbituric and thiobarbituric acids were obtained by reacting 5,5-disubstituted or 5-monosubstituted malonic acid chlorides with N-substituted ureas or thio-ureas respectively. They may be also prepared in a simpler way from the respective ureas and thioureas and dialkyl esters of malonic acid in presence of bases such as alkali metal alcoholates, as described for barbituric acid e.g. in *Organic Syntheses,* Coll. Vol. II, 60 (1957).

The method of the invention is illustrated by the following non-limitative Examples. All percentages and weights are meant by weight if not stated otherwise.

EXAMPLES 1-6

Monomer mixtures of caprolactam, sodium hydride and various co-catalysts of the general formula:

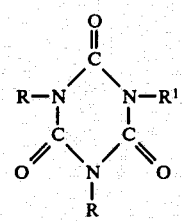

were polymerized as recorded in the following Table.

TABLE I

| Ex. | R | R¹ | Na** %mol | A* %mol | °C | time min | % (w/w) of polyamide | [η] |
|---|---|---|---|---|---|---|---|---|
| 1 | $C_6H_5$ | R | 0.51 | 0.163 | 175 | 30 | 96.3 | 2.94 |
| 2 | $C_6H_5$ | R | 0.51 | 0.163 | 155 | 60 | 95.9 | 3.01 |
| 3 | $C_6H_5$ | R | 0.3 | 0.100 | 155 | 60 | 96.1 | 7.21 |
| 4 | p-$CH_3C_6H_4$ | R | 0.729 | 0.158 | 175 | 120 | 95.9 | 4.18 |
| 5 | p-$MeOC_6H_4$ | R | 0.51 | 0.490 | 175 | 30 | 96.3 | 3.90 |
| 6 | $C_6H_5CH_2$ | R | 0.7 | 0.16 | 175 | 60 | 96.0 | 3.00 |

*cocatalyst
**sodium salt

EXAMPLE 7

A mixture consisting of 80% of caprolactam and 20% of gamma-methyl caprolactam was melted. 0.5 mol % of sodium hydride and 0.17 mol % of 1,3,5-triphenyl-sym-triazine-2,4,6-trione were dissolved therein at 100° C. After 60 minutes at 170° C a polymerizate with almost theoretical equilibrium polymer-monomer ratio was obtained.

EXAMPLE 8

0.5 mol % of sodium hydride and 0.16 mol % of 1,3,5-tri-(p-tolyl)-sym-triazine-2,4,6-trione were dissolved in a molten mixture of 15% laurolactam (cyclic lactam of omega-aminolauric acid) and 85% of caprolactam. After 60 minutes at 170° C a polymerizate with almost theoretical equilibrium content of the copolyamide was obtained. Similar result was achieved with the same amount of 1,3,5-triphenyl-sym-triazine-2,4,6-trione.

EXAMPLE 9

1 mol % of sodium hydride was dissolved at 80°-90° C in pyrrolidone and the solution cooled down to 40° C. To the solution 0.33 mol % of 1,3,5-triphenyl-sym-triazine-2,4,6-trione was added and the solution left standing for 24 hours. A polymerizate with 30% of the polyamide was obtained. In absence of the co-catalyst practically no polymer was formed (less than 1%).

EXAMPLE 10

0.5 mol % of sodium salt of caprolactam and 0.435 mol % of 1,3-dimethyl-5,5-diethyl barbituric acid were dissolved in 100 g of caprolactam and kept at 175° C under inert gas. The solution solidified within 3 minutes and contained, after 30 minutes at the same temperature, 95.6% of a very light-colored polycapronamide, average degree of polymerization 946.

EXAMPLE 11

Similarly as in the preceding Example, a mixture of molten caprolactam with 0.3 mol % of sodium and 0.278 mol % of the same co-catalyst was kept at 155° C. The solution solidified within 12 minutes and after 60 minutes at the same temperature the polymerizate contained about 96% of a very white polycaproamide. It's intrinsic viscosity (cresol) was 8.23, i.e. the average degree of polymerization was 1718.

EXAMPLE 12

The monomer mixture containing 0.293 mol % of sodium salt of caprolactam and 0.925 mol. % of the same co-catalyst as in Example 10 was heated in the same way to 210° C. The solution solidified as soon as after 2 minutes and contained after 30 minutes heating 91% of polycapronamide having the degree of polymerization 572.

EXAMPLE 13

0.003 mols of sodium hydride and 0.003 mol of 1,3,5,5-tetramethyl barbituric acid were dissolved in one mol of caprolactam at 100° C and heated to 175° C for 1 hour. Then the polymerizate contained 96% of a very white polycapronamide with a degree of polymerization of about 1000. Similar results were obtained by using as co-catalysts 1,3-diphenyl-, 1-phenyl-3-(n-butyl)- or 1-phenyl-3-octadecyl-5,5-dimethyl barbituric acids in the same concentration.

EXAMPLE 14

0.037 g of sodium hydride in form of a 50% ic oil dispersion was dissolved at 85° C in 13.73 g of caprolactam. Thereafter 0.118 g of 1,3-diphenyl-5,5-dimethyl-4-thiobarbituric acid was dissolved in the solution. By heating the mixture to 176° C a solid polymerizate was obtained within 6 minutes. After 60 minutes the yellowish polymerizate contained about 96% of a polyamide having a high degree of polymerization.

Analogous results were obtained by replacing the above co-catalyst by the same amounts of 1-phenyl-3-(p-methoxy)-, 1-phenyl-3-(p-diethylaminophenyl)- or 1-phenyl-3-(p-tolyl)-5,5-dimethyl-4-thiobarbituric acids.

EXAMPLES 15–26

Caprolactam was polymerized under the conditions described in Example 20, in the presence of its sodium salt with various co-catalysts corresponding to the identified formula, wherein the substituents $R_3$, $R_4$, $R_5$ and $R_6$ have the meanings as set out in the following Table, wherein $C_{Na}$ is the concentration of the sodium salt and $C_A$ that of the co-catalyst. The formula being:

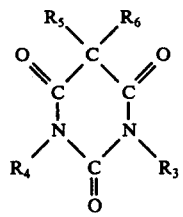

| Ex. No. | $R_5$ | $R_6$ | $R_3$ | $R_4$ | $C_{Na}$ % mol | $C_A$ % mol | °C | time min | % Conversion | [η] |
|---|---|---|---|---|---|---|---|---|---|---|
| 15 | $CH_3$ | $CH_3$ | n-$C_4H_9$ | p-$CH_3O \cdot C_6H_4$ | 0.32 | 0.30 | 175 | 60 | 96.1 | 8.01 |
| 16 | $CH_3$ | $CH_3$ | $C_2H_5$ | p-$(C_2H_5)_2N \cdot C_6H_4$ | 0.51 | 0.48 | 155 | 120 | 96.9 | 3.92 |
| 17 | $CH_3$ | $CH_3$ | $C_6H_5$ | $C_6H_{11}$(cyclo) | 0.60 | 0.40 | 180 | 30 | 95.2 | 4.38 |

-continued

| Ex. No. | $R_5$ | $R_6$ | $R_3$ | $R_4$ | $C_{Na}$ % mol | $C_A$ % mol | °C | time min | % Conversion | $[\eta]$ |
|---|---|---|---|---|---|---|---|---|---|---|
| 18 | $C_6H_5 \cdot CH_2$ | $C_6H_5 \cdot CH_2$ | $CH_3$ | $CH_3$ | 0.53 | 0.33 | 180 | 30 | 95.7 | 7.68 |
| 19 | $C_{18}H_{37}$ | $CH_3$ | $C_6H_5$ | $C_6H_5$ | 0.31 | 0.30 | 190 | 30 | 95.8 | 8.11 |
| 20 | $C_6H_5$ | $C_2H_5$ | $CH_3$ | $CH_3$ | 0.29 | 0.31 | 175 | 30 | 95.9 | 7.90 |
| 21 | $C_6H_{11}$(cyglo) | $C_2H_5$ | $CH_3$ | $CH_3$ | 0.43 | 0.40 | 175 | 30 | 95.3 | 4.76 |
| 22 | $CH_2=CH \cdot CH_2$ | $CH_2=CH \cdot CH_2$ | $CH_3$ | $CH_3$ | 0.33 | 0.40 | 175 | 60 | 96.3 | 4.60 |
| 23 | $C_4H_9$ | $C_2H_5$ | $CH_3$ | $CH_3$ | 0.70 | 0.50 | 150 | 120 | 97.0 | 3.44 |
| 24 | $C_5H_{11}$ | $C_2H_5$ | $CH_3$ | $CH_3$ | 0.35 | 0.50 | 160 | 60 | 97.2 | 3.82 |
| 25 | $C_2H_5$ | H | $C_6H_5$ | $C_6H_5$ | 0.50 | 0.35 | 175 | 120 | 96.6 | 4.02 |
| 26 | $CH_3$ | $CH_3$ | $C_6H_5$ | H | 0.53 | 0.25 | 176 | 60 | 94.0 | 2.9 |

EXAMPLE 27

The polymerization mixture was prepared by stepwise dissolving 0.3 mol % of sodium hydride and 0.3 mol % of 1,3,5,5-tetramethyl barbituric acid in one mol of caprylolactam. The mixture was maintained for 60 minutes at 160° C. A very light colored polymerizate with equilibrium content of polycapronamide, intrinsic viscosity 8.32, was obtained. Similar result was attained when polymerizing laurinolactam at equal conditions.

EXAMPLE 28

0.067 g of a 50% (weight) dispersion of sodium hydride in paraffin oil was dissolved in 10.8 g of 2-pyrrolidone at 80° C. In the solution of sodium salt of pyrrolidone in pyrrolidone thus obtained 0.245 g of 1,3-dimethylveronal (1,3-dimethyl 5,5 diethyl barbituric acid) was dissolved. During 4 hours at 25° C about 10% of the monomer was polymerized and the polymer precipitated, whereas in absence of the co-catalyst the solution turned only slightly opaque and practically no polymer was obtained.

What is claimed is:

1. Method of preparing a solid polyamide by anionic polymerization of at least one cyclic lactam containing from 6 to 12 carbon atoms in the lactam ring comprising the steps of dissolving in a lactam a catalyst comprising 0.3–1.0 mol % of an alkali metal hydride or alkali metal salt of a lactam and 0.1–0.49 mol % of at least one cyclic co-catalyst and having the formula

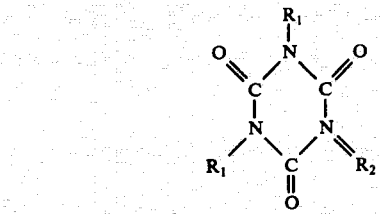

wherein $R_1$ and $R_2$ are each an aryl group having 1 or 2 benzene rings, an alkoxyaryl, dialkylaminoaryl, alkylated aryl or arylated alkyl, and heating at 40°–175° C. for from 0.5 to 24 hours.

2. The method of claim 1, wherein said $R_2$ is an arylated alkyl.

3. The method of claim 2, wherein said arylated alkyl is benzyl.

4. The method of claim 1, wherein said $R_2$ is an alkylated aryl, having from 1 to 18 carbon atoms in the alkyl group.

5. The method of claim 4, wherein said alkylated aryl is tolyl.

6. The method of claim 1, wherein at least one of said $R_1$, $R_2$ is phenyl.

7. The method of claim 1, wherein at least one of said $R_1$ and $R_2$ is an alkoxy aryl.

8. The method of claim 7, wherein said alkoxy aryl is methoxy phenyl.

9. The method of claim 1, wherein at least one of said $R_1$ and $R_2$ is a dialkylaminoaryl.

* * * * *